United States Patent [19]

Brand

[11] 4,452,255
[45] Jun. 5, 1984

[54] APPARATUS FOR TRANSPORTING AND CLASSIFYING DISCRETE ARTICLES OF THE TOBACCO PROCESSING INDUSTRY

[75] Inventor: Peter Brand, Hamburg, Fed. Rep. of Germany

[73] Assignee: Hauni-Werke Körber & Co. KG., Hamburg, Fed. Rep. of Germany

[21] Appl. No.: 370,169

[22] Filed: Apr. 20, 1982

[30] Foreign Application Priority Data

Apr. 25, 1981 [DE] Fed. Rep. of Germany ....... 3116545

[51] Int. Cl.³ .......................... A24C 5/35; A24C 5/58
[52] U.S. Cl. ..................................... 131/282; 131/94; 131/95; 198/438; 271/196; 271/197
[58] Field of Search ................ 198/438; 271/196, 197; 131/94, 95, 280, 282

[56] References Cited

U.S. PATENT DOCUMENTS 3,348,552 10/1976 McCarthy ............................. 131/94
3,363,632 1/1968 Gamerini ............................. 131/94
3,483,873 12/1963 Hinzmann ........................... 131/281
3,665,930 5/1972 Giatti ..................................... 131/94
4,391,372 7/1983 Calhoun .............................. 198/438

Primary Examiner—Vincent Millin
Assistant Examiner—Harry J. Macey

Attorney, Agent, or Firm—Peter K. Kontler

[57] ABSTRACT

Apparatus for selectively transferring cigarettes, uniting bands or other discrete articles from a first onto a second conveyor has a first suction generating device which communicates with suction ports in the periphery of the cylindrical rotor of the first conveyor while such ports advance along a first portion of a first endless path, and a discrete second suction generating device which can be activated to draw air from the ports in a second portion of the first path adjacent to a portion of a second endless path defined by the second conveyor. When the second suction generating device is activated, the articles which reach the second portion of the first path are not transferred onto the second conveyor. The second suction generating device can constitute an injector which can be activated or deactivated by a valve within a few milliseconds. Such injector can receive compressed gas from a source which is further connected with a pipe admitting compressed gas into the ports of the second conveyor during travel of such ports past the transfer station between the two conveyors and while the second suction generating device is activated. The ports in the first portion are sealed from the ports in the second portion of the first path by a stationary valve member.

18 Claims, 3 Drawing Figures

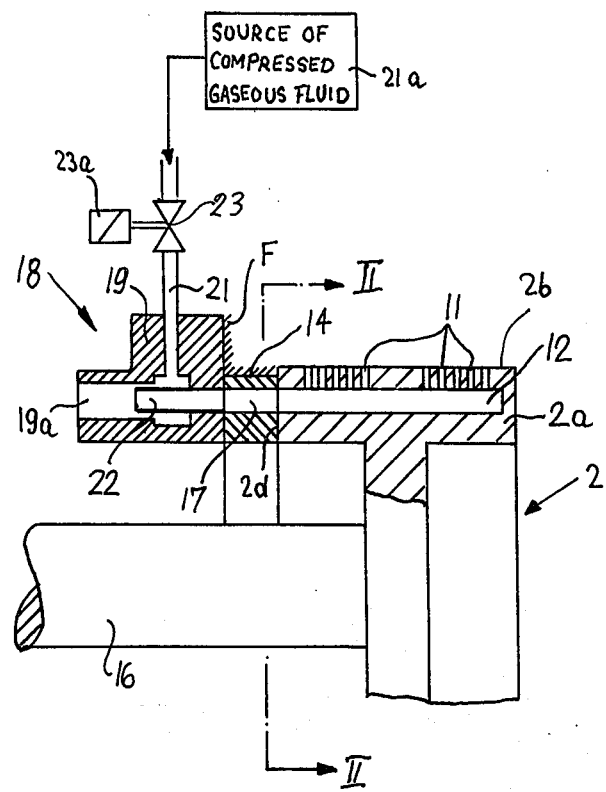

APPARATUS FOR TRANSPORTING AND CLASSIFYING DISCRETE ARTICLES OF THE TOBACCO PROCESSING INDUSTRY

BACKGROUND OF THE INVENTION

The present invention relates to apparatus for transporting and classifying discrete articles, especially articles which constitute or form part of smokers' products. More particularly, the invention relates to improvements in article transporting and classifying apparatus of the type wherein at least one conveyor, especially a continuously driven conveyor, has an endless article-supporting component with suction ports serving to attract articles to the supporting component.

In the processing of tobacco, it is often necessary to transport a layer of discrete articles along a path which is defined by two or more conveyors so that the articles must be transferred from conveyor to conveyor, for example, during travel from a making or producing machine to a consuming or processing machine or from a first processing machine to a second processing machine. Articles of the just outlined character include plain or filter cigarettes, cigars or cigarillos, filter rod sections, labels, uniting bands, groups of rod-shaped articles including filter rod sections and plain cigarettes, cigarillos or cigars, pairs of coaxial plain cigarettes or filter cigarettes, or the like. For the sake of simplicity, the following part of the description under this subtitle will discuss the transport of cigarettes with the understanding, however, that other discrete articles of the tobacco processing industry can be treated in the same or in a similar way.

It is well known that plain or filter cigarettes are transported by endless conveyors, especially in the form of rotary drums, during manufacture or processing in cigarette making or filter tipping machines. As a rule, the cigarettes are attracted to the peripheries of such drums by suction which is applied via ports provided in the peripheral surfaces of the drums to ensure retention of the cigarettes in flutes, cradles or directly on the convex peripheral surface of the respective drum. In many instances, the cigarettes are transported in the form of a single layer and their longitudinal axes extend at right angles to the direction of transport (i.e., the cigarettes are transported sideways). The suction ports are connected with a suitable suction generating device during travel along that portion of their endless path wherein the cigarettes should adhere to and share the movement of the respective conveyor. If the cigarettes of the single layer are to be transferred onto the periphery of a next-following drum-shaped conveyor, the application of suction to successive ports is terminated at the station where the transfer from the oreceding conveyor onto the next-following conveyor is to take place, and the suction ports of the next-following conveyor begin to communicate with a suction generating device as soon as they reach the transfer station. In other words, a port which approaches the transfer station and attracts a cigarette to the preceding conveyor is connected with the respective suction generating device whereas a port which approaches the transfer station but is machined into the peripheral surface of the nextfollowing conveyor is disconnected from the respective suction generating device or, even if connected to the respective suction generating device, is not capable of actually attracting a cigarette until it reaches the transfer station.

In most cigarette making, filter tipping or like machines, the means for regulating the flow of air from the suction ports to the respective suction generating device or devices includes so-called valve plates which are grooved discs or plates interposed in the path of air flow from the ports of the conveyors to the suction generating devices and serving to determine the length of those portions of peripheral surfaces of the respective conveyors along which the cigarettes travel on their way to the transfer station. A valve plate can be placed adjacent to one end face of a rotary drum-shaped conveyor, or it can be mounted in the interior of a hollow rotary drum-shaped conveyor to determine the number and orientation of those suction ports which are free to communicate with the suction generating device, e.g., with the suction intake of a blower. The just discussed mode of regulating the number and orientation of those suction ports which are to communicate with the suction generating device is quite satisfactory and does not present serious problems. even in modern high-speed cigarette making, filter tipping or like machines, when all cigarettes of a single layer of such articles are to be transferred from a preceding conveyor onto the next-following conveyor or into storage. Successive suction ports of the preceding conveyor are simply sealed from the suction generating device not later than on arrival at the transfer station so that successive cigarettes of the single layer cease to be attracted to the preceding conveyor and can leave such conveyor under the action of gravity, in response to the stripping action of arcuate or other suitable mechanical separating devices, or in response to attraction by the next-following conveyor whose suction ports begin to communicate with the respective suction generating device not later than when they reach the transfer station.

However, the situation is quite different if certain (selected) cigarettes of the single layer which is transported by the preceding conveyor are to remain on the preceding conveyor while the remaining cigarettes leave the preceding conveyor at the aforediscussed transfer station to be accepted and transported by the next-following conveyor. Such situation can arise, for example, when a layer of cigarettes is transported past a testing device which detects defective cigarettes and generates signals serving to effect segregation of defective cigarettes from satisfactory cigarettes. The segregation can involve retention of satisfactory or defective cigarettes on the preceding conveyor and the transfer of defective or satisfactory cigarettes onto the next-following conveyor. Since the layer contains defective cigarettes in random distribution with satisfactory cigarettes, it is necessary to rapidly change the circumstances prevailing at the transfer station, for example, in such a way that an oncoming defective cigarette will continue to travel with the preceding conveyor past the transfer station but each and every satisfactory cigarette will be transferred onto the next-following conveyor. Such change of circumstances is effected by signals which are generated by the testing device and are transported or advanced in synchronism with (i.e., in imitation of) travel of the respective defective cigarettes to the transfer station. This creates numerous problems in a modern high-speed cigarette making or processing machine which turns out extremely large quantities of cigarettes per unit of time (normally not less than one hundred per second). For example, if the layer which is transported by the preceding conveyor contains a satisfactory cigarette between two defective cigarettes, the suction port or ports which attract the first defective cigarette must continue to communicate with the respective suction generating device during transport past the transfer station, the next suction port or ports which attract the satisfactory cigarette must be disconnected from the suction generating device on arrival at the transfer station so that the satisfactory cigarette can be taken over by the next-following conveyor, and the next suction port or ports must again continue to communicate with the suction generating device in order to ensure that the second defective cigarette will advance past the transfer station and remain on the preceding conveyor. In other words, it is often necessary to shift from retention to release or vice versa within extremely short intervals of time such as are required to transport a suction port through a distance corresponding to that between two neighboring cigarettes of the layer on the first conveyor. The duration of each such interval is in the range of a few milliseconds. Heretofore known devices which are used to connect the oncoming suction ports with or to disconnect the oncoming suction ports from the suction generating device are not sufficiently reliable to guarantee selective retention of cigarettes on the preceding conveyor when the cigarettes are transported at speeds which are required in a modern cigarette maker, filter tipping machine or the like.

OBJECTS AND SUMMARY OF THE INVENTION

An object of the invention is to provide a novel and improved apparatus which can selectively transport certain discrete articles of a single layer of articles along a first path while the remaining articles of the same layer are transferred into a second path or vice versa.

Another object of the invention is to provide a relatively simple but highly reliable apparatus of the just outlined character which can be used with particular advantage in connection with the transport of discrete articles of the tobacco processing industry, such as uniting bands, filter rod sections and plain or filter cigarettes, cigarillos or cigars.

A further object of the invention is to provide the apparatus with novel and improved means for regulating the application or termination of subatmospheric pressure to ports which advance toward and move past and beyond the transfer station between two successive conveyors or the like and are provided in one such conveyor.

An additional object of the invention is to provide an apparatus which can operate properly at low speeds, at elevated speeds as well as at extremely high speeds which are required in modern tobacco processing machines serving to turn out in excess of six thousand and up to ten thousand articles per minute.

A further object of the invention is to provide an apparatus which is especially suited for effecting reliable segregation of discrete satisfactory articles from discrete defective articles which are randomly distributed among the satisfactory articles.

Another object of the invention is to provide a machine which embodies the above outlined apparatus.

An additional object of the invention is to provide the apparatus with novel and improved means for reliably interrupting the connection between a rapidly moving suction port and a suction generating device or for rapidly reestablishing such connection, even if the interruption or reestablishment of the connection must be completed within a minute fraction of a second, such as within a few milliseconds.

Another object of the invention is to provide an apparatus of the above outlined character which can be readily installed in existing machines or production lines, such as in existing cigarette making, filter tipping or other tobacco processing machines.

An additional object of the invention is to provide the apparatus with novel and improved suction generating means for reduction of pressure in the ports arriving at the transfer station between two neighboring conveyors.

Another object of the invention is to provide an apparatus of the above outlined character which does not occupy more room than heretofore known apparatus and which is especially suited for effecting controlled transfer of discrete articles between rotary drum-shaped conveyors.

The invention resides in the provision of an apparatus for transporting a series of discrete articles, particularly a layer or row of articles of the tobacco processing industry. The apparatus comprises a first conveyor having an article supporting component (such as a hollow cylindrical rotor) which is movable along an endless first path and has suction ports for retention of articles thereon, first suction generating means which communicates with the ports in a first portion of the path, second suction generating means which communicates with the ports in a second portion of the path, and regulating means for activating or deactivating the second suction generating means so that the articles entering the second portion of the path are attracted to the component of the first conveyor in activated condition of the second suction generating means. The apparatus further comprises a valve member or other suitable means for sealing the ports in the first portion of the path from the ports in the second portion of the path. The path is preferably, but need not necessarily be, a circular path.

The apparatus can further comprise a second conveyor comprising a second article supporting component which is movable along a second endless path having a portion adjacent to the second portion of the first endless path. The second component is also provided with suction ports for retention of articles thereon. Such apparatus can further comprise means for connecting the ports of the second component with the first suction generating means, at least while the ports of the second component advance along the aforementioned portion of the second path (such portion of the second path and the second portion of the first path can be said to occupy a transfer station where the articles can be transferred from the first conveyor onto the second conveyor when the second suction generating means is deactivated). Still further, the two-conveyor apparatus can comprise means for selectively admitting a compressed gaseous fluid into the ports of the second component during travel of such ports along the aforementioned portion of the second path; such admission of compressed gaseous fluid will take place while the second suction generating means is activated to ensure that the articles in the second portion of the first path are attracted to the component of the first conveyor.

The second suction generating means can comprise an injector. Such injector can comprise a source of compressed gaseous fluid, an open-ended suction pipe communicating with the ports in the second portion of the first path, and conduit means for conveying compressed gas past the open end of the pipe so that the latter draws air from the ports in the second portion of the first path. The regulating means then comprises a shutoff valve which is or can be installed in the conduit means to activate the second suction generating means by permitting compressed gas to flow from the source toward and past the pipe of the injector.

The length of the second portion of the first path can be selected in such a way that it suffices to accommodate one article at a time. Thus, if the supporting component of the first conveyor has an annulus of equidistant suction ports, the length of the second portion of the first path (as considered in the direction of movement of articles with the first conveyor) is such that this second portion accommodates one port of the annulus at a time.

The aforementioned two-conveyor apparatus can further comprise means for admitting compressed gaseous fluid from the source of compressed gaseous fluid into the ports of the second component while such ports advance along the aforesaid portion of the second path and while the regulating means maintains the second suction generating means in activated condition. This obviates the need for a discrete source of compressed gaseous fluid, i.e., the source which forms part of or cooperates with the injector constituting the second suction generating means can also serve as a means for supplying compressed gaseous fluid to the ports of the second component when the second suction generating means is activated to attract the articles to the component of the first conveyor during travel of articles along the second portion of the first path.

If the second suction generating means is or comprises an injector, it can be designed to connect the ports in the second portion of the first path with the atmosphere in deactivated condition of the second suction generating means.

The articles may constitute cigarettes or analogous rod-shaped articles which form part of or are smokers' products. Alternatively, the articles may constitute discrete sheets of paper or the like, e.g., uniting bands of the type used in filter tipping machines.

The aforementioned sealing means can constitute a stationary valve member which is adjacent to one axial end of a rotary cylindrical component in the first conveyor, or a stationary valve member in the interior of a hollow cylindrical component in the first conveyor. Each of the supporting components can be a rotary cylinder having a peripheral surface provided with article receiving flutes, especially if the articles are cigarettes or analogous rod-shaped commodities.

The second portion of the first path can be located downstream of the first portion of the same path, and such path can comprise a third portion which is located downstream of the second portion. The ports in the third portion of the first path can be connected with the first suction generating means to ensure the retention of articles which have advanced beyond the second portion of the first path, i.e., of those articles which should not be transferred onto the second conveyor.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly diagrammatic, partly elevational and in part axial sectional view of an apparatus which embodies one form of the invention and is designed to transport a single layer of adhesive-coated uniting bands in a filter tipping machine;

FIG. 2 is a partly end elevational and partly transverse sectional view as seen in the direction of arrows from the line II—II of FIG. 1.

DESCRIPTION OF THE PREFERRED EMBODIMENTS

Figure 3:
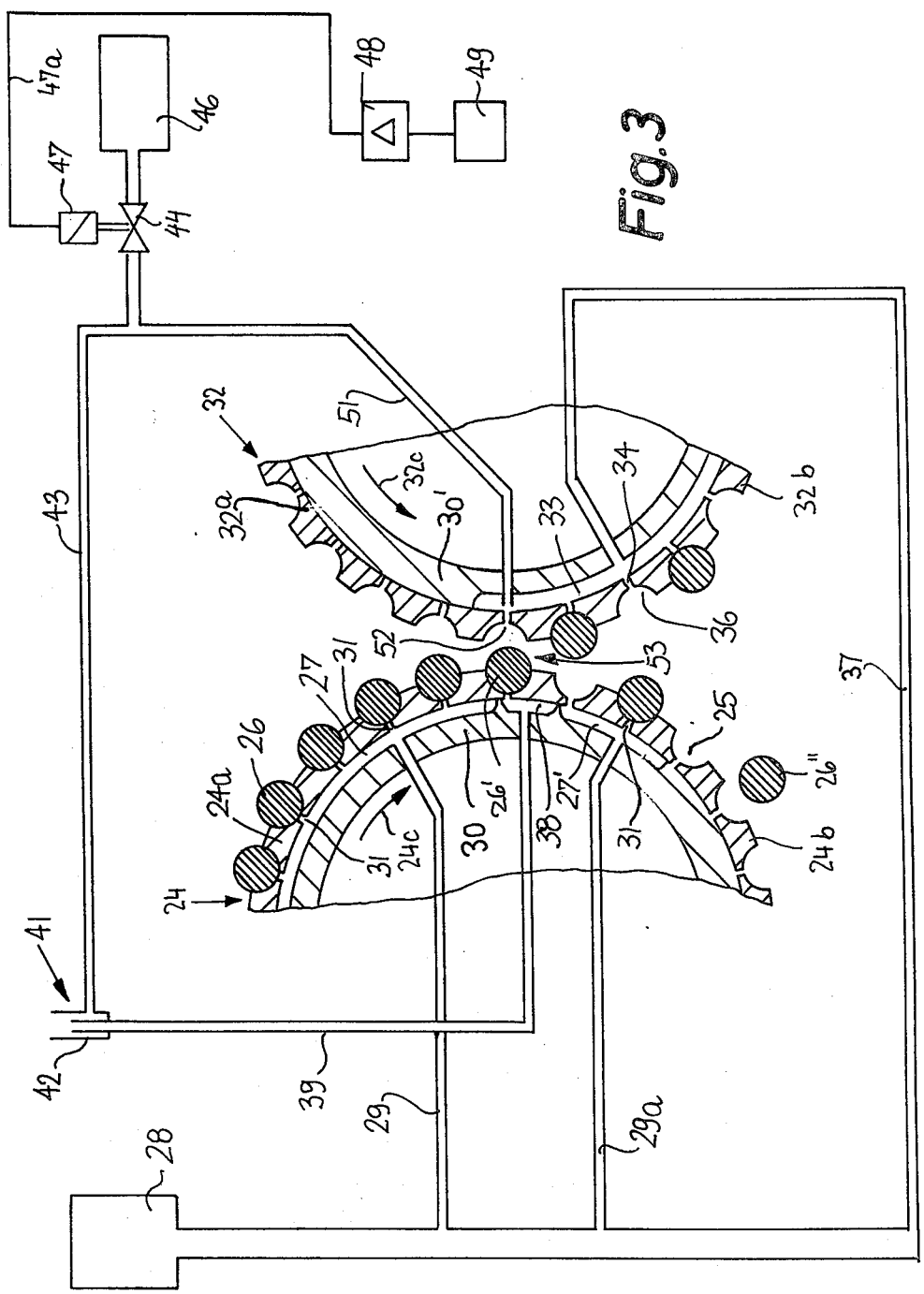
FIG. 3 is a fragmentary partly schematic, partly end elevational and partly transverse sectional view of a second apparatus which is designed to transport rod-shaped articles, such as plain or filter tipped cigarettes, downstream of a testing station.

FIGS. 1 and 2 show an apparatus which embodies one form of the invention and is installed in a filter tipping machine wherein pairs of plain cigarettes are assembled with filter rod sections of double unit length by means of adhesive-coated uniting bands 4 to form therewith filter cigarettes of double unit length. Machines of such type are known as MAX and MAX S, and are manufactured and sold by the assignee of the present application. Reference may be had, for example, to commonly owned U.S. Pat. No. 4,262,680 granted Apr. 21, 1981 to Alfred Hinzmann. The disclosure of this patent is incorporated herein by reference.

A continuous web or strip 1 of tipping paper (e.g., cigarette paper or imitation cork) is drawn off a bobbin (not shown) by a pair of advancing rolls (not shown), and one side of the running web 1 is coated with a suitable adhesive before successive increments of the web reach the peripheral surface 2b of the rotary cylindrical article supporting component 2a of a drum-shaped conveyor 2 which cooperates with a rotary drum-shaped knife holder 3 to sever the leader of the web 1 at regular intervals and to thus form a single layer or file of discrete sheet-like articles in the form of uniting bands 4. The knives on the holder 3 are shown at 3a.

The component or rotor 2a of the conveyor 2 transports successive satisfactory and unsatisfactory uniting bands 4 to a transfer station 6 where the satisfactory bands are applied to successive groups 7 of coaxial rod-shaped articles which are transported by the axially parallel peripheral flutes 9 of a rotary drum-shaped conveyor 8. In the embodiment which is shown in FIGS. 1 and 2, the conveyors 2 and 8 are continuously driven to rotate in opposite directions at the same peripheral speed (note the arrows 2c and 8c in FIG. 2). The adhesive-coated sides or surfaces of the uniting bands 4 face away from the peripheral surface 2b of the rotor 2a. Each group 7 contains two spaced-apart coaxial plain cigarettes of unit length and a filter rod section or filter plug of double unit length therebetween. The uniting bands 4 are applied to the oncoming groups 7 in such a way that they are disposed tangentially of the respective groups and extend along the full axial length of the corresponding filter plug as well as along the inner end portions of the associated plain cigarettes. When the uniting bands 4 are thereupon convoluted around the respective groups 7, they convert such groups into filter cigarettes of double unit length which are thereupon severed midway across their filter plugs to yield pairs of filter cigarettes of unit length. The conversion takes place on a rolling conveyor (not shown) which receives successive groups 7 (with the uniting bands 4 attached thereto) from the flutes 9 of the conveyor 8 and cooperates with a stationary or mobile rolling device, e.g., in a manner as disclosed in commonly owned U.S. Pats. Nos. 3,483,873 and 3,527,234 respectively granted Dec. 16, 1969 and Sept. 8, 1970 to Alfred Hinzmann.

The peripheral surface 2b of the rotor 2a is formed with an annulus consisting of equidistant rows of aligned suction ports or openings 11. Each such row is parallel to the axis of the conveyor 2 (see FIG. 1), and the inner end portions of the ports 11 in a row communicate with one of a series of axially parallel blind bores or channels 12 which are machined into or otherwise formed in the conveyor 2 and have open ends at the end face 2d of the rotor 2a. The end face 2d of the rotor 2a is adjacent to one end face of a stationary disc-shaped valve member 14 which is coaxial with the conveyor 2 and has two arcuate grooves or slots 13 and 17 whose radii of curvature match the radius of the circle formed by the channels 12. When the conveyor 2 is driven to rotate in the direction of arrow 2c, successive channels 12 (and hence the corresponding rows of suction ports 11) communicate first with the groove 13 during travel of such channels along a first portion of the endless path defined by the conveyor 2 (in FIG. 2, such portion of the path extends along an arc of approximately 70 degrees), and thereupon along a second portion of this path (the second portion of the path extends along the groove 17 which is located downstream of the groove 13, as considered in the direction of rotation of the conveyor 2). In the embodiment of FIGS. 1 and 2, the groove 17 extends along an arc of approximately 30 degrees.

The groove 13 of the valve member 14 is in permanent communication with a first suction generating device 113. This valve member is or can be mounted on but does not rotate with a coaxial drive shaft 16 which rotates the conveyor 2 in the direction of arrow 2c. If desired, the valve member 14 can be mounted in the frame F of the filter tipping machine.

The manner in which the end face 2d of the rotor 2a is biased against one end face of the valve member 14 and in which the other end face of the valve member is biased against a stationary sealing block 19 forms no part of the invention. All that counts is to ensure that successive channels 12 of the conveyor 2 communicate first with the groove 13 and thereupon with the groove 17 when the shaft 16 is driven by the main prime mover of the filter tipping machine to rotate the conveyor 2 relative to the valve member 14. As shown in FIG. 2, a freshly formed uniting band 4 is attracted to the peripheral surface 2b of the rotor 2a because the nearest rows of suction ports 11 then communicate with the groove 13 wherein the pressure is always less than atmospheric pressure so that the uncoated sides of successive uniting bands 4 adhere to and share the movement of the adjacent portion of the peripheral surface 2b. When the leader of a uniting band 4 reaches the transfer station 6 and is attached to the oncoming group 7 of three coaxial rod-shaped articles, the corresponding suction ports 11 advance beyond the transfer station 6 and begin to communicate with the groove 17 of the valve member 14. The arrangement is such that the last row of ports 11 which are adjacent to a partially transferred uniting band 4 moves beyond the downstream end of the stationary groove 13 not later than when such uniting band must be fully separated from the conveyor 2 in order to advance with the conveyor 8, namely, to the aforementioned rolling conveyor which converts successive uniting bands into tubes surrounding the respective filter rod sections of double unit length and the inner end portions of the associated plain cigarettes of unit length.

The groove 17 of the valve member 14 does not communicate with the suction generating device 113 which draws air from the groove 13. In fact, the valve member 14 permanently seals the groove 13 from the groove 17. In accordance with a feature of the invention, the groove 17 is connectable with a discrete second suction generating device 18 when a uniting band 4 is to remain on the conveyor 2, i.e., when a uniting band is to continue its movement with the peripheral surface 2b beyond the transfer station 6. The second suction generating device 18 comprises or constitutes an injector whose body 19 constitutes the aforementioned sealing block for the left-hand side or end face of the valve member 14, as viewed in FIG. 1. The injector 18 further comprises an open-ended suction pipe 22 communicating with the groove 17 of the valve member 14 and a conduit 21 containing a solenoid-operated regulating valve 23 and connected at its outer end with a source 21a of compressed air. The body 19 of the injector 18 defines a chamber 19a which communicates with the discharge end of the conduit 21 and with the discharge end of the pipe 22. Furthermore, the chamber 19a is in permanent communication with the atmosphere. When the regulating valve 23 is opened (e.g., in response to a signal which is generated by a device for monitoring the uniting bands 4 to ascertain whether or not one side of each uniting band is coated with adhesive), the conduit 21 admits a stream of compressed air into the chamber 19a with the result that such air escapes into the atmosphere and draws air from the pipe 22, i.e., from the groove 17 and hence from those suction ports 11 which then communicate with the groove 17.

The operation of the apparatus which is shown in FIGS. 1 and 2 is as follows:

If the conveyor 8 delivers a series of satisfactory groups 7 toward the transfer station 6, and if the conveyor 2 delivers satisfactory uniting bands 4 (i.e., uniting bands whose outer sides are properly coated with adhesive so that they can adhere to the oncoming groups 7), the regulating valve 23 is closed and the groove 17 of the valve plate 14 communicates with the atmosphere via pipe 22 and chamber 19a of the injector 18, i.e., the injector is deactivated. This is due to the fact that the conduit 21 does not admit compressed air from the source 21a and, therefore, the pressure in the groove 17, as well as in each channel 12 which communicates with the groove 17, equals atmospheric pressure. The pressure in the ports 11 which communicate with the groove 17 also matches atmospheric pressure so that the conveyor 2 ceases to attract those portions of successive uniting bands 4 which advance beyond the transfer station 6. Therefore, and since the adhesive-coated sides of the uniting bands 4 which reach the transfer station 6 already adhere to the corresponding groups 7, such groups remove the uniting bands 4 from the conveyor 2 and cause the uniting bands to advance with the conveyor 8. The flutes 9 of the conveyor 8 preferably communicate with suction ports which attract the groups 7 during travel toward, past and beyond the transfer station 6.

However, if a uniting band 4 is to remain on the conveyor 2, i.e., if such uniting band should not be transferred onto the conveyor 8, the regulating valve 23 is opened in response to a suitable signal which energizes or deenergizes its solenoid 23a. The signal can be generated in response to detection of the absence of adhesive coat on a particular uniting band 4 so that such uniting band would fail to adequately adhere to the oncoming group 7 even if it were released by the conveyor 2. The defect signal is transported in synchronism with the defective uniting band 4 so that the regulating valve 23 opens when the first row of suction ports 11 which attract the defective uniting band 4 to the peripheral surface 2b of the rotor 2a moves beyond the downstream end of the groove 13 in the valve member 14. The regulating valve 23 then admits compressed air from the source 21a via conduit 21 so that a stream of compressed air flows into the chamber 19a and thence into the atmosphere, i.e., the injector 18 is activated. This induces the flow of air from the groove 17 and in a direction to the left, as viewed in FIG. 1, namely, through the pipe 22 of the injector 18, so that the pressure in the groove 17 abruptly drops below atmospheric pressure and the suction ports 11 which move into register with the upstream end of the groove 17 continue to attract the defective uniting band 4 to the peripheral surface 2b of the rotor 2a. It has been found that the regulating valve 23 can be opened or closed within an extremely short interval of time so that the injector 18 can establish in the groove 17 a subatmospheric pressure within a few milliseconds to thus ensure that a defective uniting band 4 continues to adhere to the conveyor 2 instead of being transferred onto the conveyor 8 during travel past the station 6. This renders it possible to retain selected uniting bands 4 on the conveyor 2 with a surprisingly high degree of reliability, even if the conveyor 2 is driven at a speed such as is required in a modern filter tipping machine which turns out thousands and thousands of filter cigarettes per minute. Moreover, the solenoid 23a can be energized and deenergized in rapid sequence so that a single defective uniting band 4 which continues to adhere to the conveyor 2 can be followed by a single satisfactory uniting band which, in turn, can be followed by a single defective uniting band, and so forth. A defective uniting band 4 which has been transported beyond the transfer station 6 while remaining adjacent to the peripheral surface 2b of the rotor 2a can be released downstream of the transfer station 6, e.g., at the six o'clock position of the conveyor 2, to be admitted (by gravity and/or by a blast of compressed air and/or by a mechanical stripping device) into a collecting receptacle (not shown) for unsatisfactory uniting bands. The collecting receptacle is desirable and advantageous because it prevents the defective uniting bands from contaminating and eventually interfering with proper operation of the filter tipping machine.

It goes without saying that the solenoid 23a of the regulating valve 23 can also be energized or deenergized in response to signals which are indicative of defective (e.g., incomplete) groups 7. For example, the groups 7 can be monitored on or ahead of the conveyor 8 (i.e., ahead of the transfer station 6) and, if a group 7 is incomplete or is defective for any other reason, the regulating valve 23 is opened when the corresponding group 7 approaches the transfer station 6 to ensure that the uniting band 4 (even a satisfactory uniting band) which would have been attached to the defective group 7 continues to adhere to the peripheral surface 2b of the rotor 2a and is admitted into the aforementioned receptacle.

Once a defective uniting band 4, or a uniting band which is to remain on the conveyor 2 for another reason (such as the defectiveness of the corresponding group 7), has been advanced beyond the transfer station 6, the condition of the solenoid 23a is changed again so that the next-following uniting band 4 is properly transferred onto the oncoming group 7 provided, of course, that such group and/or the uniting band 4 is free of defects.

The length of that portion of the endless path defined by the conveyor 2 which extends along the transfer station 6 and wherein the ports 11 communicate with the second suction generating device 18 can be reduced to a fraction of the length of the illustrated groove 17, as considered in the direction of rotation of the rotor 2a. Thus, the length of the groove 17 can be reduced to such an extent that only one uniting band 4 can be attracted by the ports 11 which communicate with the groove 17, i.e., from which air is evacuated by the suction generating device 18. This can be seen in FIG. 3. Such arrangement further reduces the length of intervals which are required to raise or lower the pressure in the groove 17. As a rule (but not necessarily), the length of the groove 13 will exceed the length of the groove 17 because this further contributes to rapid evacuation of air from the groove 17 and rapid reestablishment of atmospheric pressure in such groove.

FIG. 3 illustrates a modified apparatus which can be incorporated in a producing or processing machine, e.g., in a filter tipping machine, to selectively segregate certain rod-shaped articles 26 (e.g., filter cigarettes of unit length) from a single row or layer of filter cigarettes which move sideways, i.e., at right angles to their longitudinal axes. The apparatus comprises a first rotary drum-shaped conveyor 24 having a hollow cylindrical component or rotor 24a whose peripheral surface 24b is formed with axially parallel article-receiving flutes 25 for discrete filter cigarettes 26. The conveyor 24 is driven by the main prime mover of the filter tipping machine to rotate in a clockwise direction (note the arrow 24c). Each flute 25 communicates with at least one radially inwardly extending suction port 31 which extends all the way to the internal surface of the hollow cylindrical rotor 24a of the conveyor 24 and communicates with a first arcuate groove 27 of a stationary valve member 30 in the interior of the rotor 24a. The groove 27 terminates at a transfer station 53 where successive satisfactory cigarettes 26 are to leave their respective flutes 25 to be transferred into the oncoming flutes 36 in the peripheral surface 32b of a cylindrical component or rotor 32a forming part of a second rotary drum-shaped conveyor 32. The conveyor 32 is driven to rotate in a counterclockwise direction (note the arrow 32c) at a peripheral speed which matches that of the conveyor 24. The flutes 36 are parallel to the axis of the conveyor 32.

The apparatus of FIG. 3 further comprises a first suction generating device 28 which communicates with the groove 27 by way of a conduit 29 so that the pressure in the groove 27 is always below atmospheric pressure. Thus, all such flutes 25 which advance along that portion of the endless path defined by the conveyor 24 which is adjacent to the groove 27 retain their cigarettes 26 because the corresponding ports 31 communicate with the groove 27 and hence with the conduit 29 and suction generating device 28. If each of the flutes 25 communicates with a row of two or more suction ports 31, the valve member 30 can be formed with two or more grooves 27, one for each port 31 of a row. The construction of means for establishing sub-atmospheric pressure in ports which communicate with flutes at the periphery of a rotary drum-shaped conveyor for the transport of cigarettes or the like is well known in the tobacco processing industry. Therefore, the exact details of the system which establishes subatmospheric pressure in the ports 31 moving past the groove or grooves 27 in the valve member 30 form no part of the present invention.

The rotor 32a of the second conveyor 32 is also formed with suction ports 34 which communicate with the respective flutes 36 and cause such flutes to attract the transferred cigarettes 26 while the flutes advance past and beyond the transfer station 53. The stationary valve member in the rotor 32a of the conveyor 32 is shown at 30'; this valve member has a peripheral groove 33 which is connected with a suitable suction generating device. In the illustrated embodiment, the groove 33 is connected with the suction generating device 28 by a conduit 37.

In accordance with a feature of the invention, the valve member 30 in the rotor 24a of the first conveyor 24 is formed with a second groove 38 which is located downstream of the groove 27, as considered in the direction of arrow 24c, and is adjacent to the transfer station 53. This second groove can be connected with a discrete second suction generating device which again comprises an injector 41 having an open-ended suction pipe 39 which communicates with the groove 38 and also communicates with the atmosphere by way of a chamber 42 in the body or housing of the injector 41. The chamber 42 is further connected with the discharge end of a conduit 43 which is connectable with a source 46 of compressed air by way of a solenoid-operated regulating valve 44 corresponding to the regulating valve 23 of FIG. 1. When the solenoid 47 of the regulating valve 44 is energized or deenergized in response to transmission of a suitable signal via conductor means 47a, the valve 44 opens and admits a stream of compressed air into the chamber 42. Such air can escape into the atmosphere to thereby establish a flow of air from the groove 38, through the conduit 39, through the chamber 42 and into the atmosphere with the result that the pressure in the groove 38 rapidly drops below atmospheric pressure and the groove 38 prevents an oncoming flute 25 from allowing the transfer of its cigarette 26 into the oncoming flute 36 of the conveyor 32, i.e., the injector 41 is then activated to attract that cigarette which is adjacent to a second portion of the path defined by the conveyor 26 and extending along the second groove 38 of the valve member 30. In order to further reduce the likelihood of transfer of a cigarette 26 which reaches the transfer station 53, while the regulating valve 44 is open, onto the conveyor 32, the apparatus further comprises a pressure line 51 which communicates with the conduit 43 and whose discharge end 52 is closely adjacent to the internal surface of the rotor 32a of the conveyor 32 to discharge a stream of compressed air into the oncoming flute 34 at the exact moment when such flute is located at the transfer station 53. In other words, the pressure line 51 selectively admits compressed air against the exposed surface of that cigarette (shown at 26' in FIG. 3) which is to remain on the conveyor 24. Since the discharge end 52 of the line 51 is close to the internal surface of the rotor 32a of the conveyor 32, the stream of compressed air which is allowed to issue from the line 51 and finds its way into the groove 33 cannot unduly change the pressure in this groove so that the cigarettes 26 which are already received in the flutes 36, while such flutes advance along and communicate with the groove 33, remain on the conveyor 32.

The solenoid 47 receives signals from a signal generator 49 by way of an amplifier 48 whose output is connected with the conductor means 47a. The signal generator 49 may form part of a testing device which monitors successive cigarettes 26 upstream of the transfer station 53 and generates defect signals in response to detection of defective cigarettes 26', i.e., in response to detection of those cigarettes which should not be transferred onto the conveyor 32. Alternatively, the signal generator 49 may constitute a manually or otherwise operable switch which is actuated by the attendant when the attendant desires to remove from the conveyor 24 one or more samples downstream of the transfer station 53. Testing devices which can generate defect signals in response to detection of defective cigarettes or analogous rod-shaped articles of the tobacco processing industry are disclosed, for example, in commonly owned U.S. Pat. No. 3,962,906 granted June 15, 1976 to Heitmann et al. The disclosure of this patent is incorporated herein by reference.

The operation of the apparatus which is shown in FIG. 3 is as follows:

When the cigarettes 26 which advance with the conveyor 24 toward the transfer station 53 are satisfactory, the regulating valve 44 is closed so that the pressure in the groove 38 of the valve member 30 matches atmospheric pressure, i.e., the injector 41 is deactivated. Therefore, successive cigarettes 26 which reach the transfer station 53 are released by the conveyor 24 (the groove 27 terminates short of the transfer station) and are attracted by the oncoming flutes 36 which, at such time, already communicate with the groove 33.

If a selected cigarette 26' (e.g., a defective cigarette or a cigarette which is to be removed as a sample) is to remain on the conveyor 24 during travel past and beyond the transfer station 53, the solenoid 47 of the regulating valve 44 is actuated so that the valve 44 opens and admits compressed air into the conduit 43 and line 51. It is assumed that the regulating valve 44 opens in response to defect signals from the signal generator 49 which is assumed to form part of or to be operatively connected with a testing device. The manner in which the signal which is generated at 49 is delayed so that it reaches the solenoid 47 just in time for opening of the regulating valve 44 when the cigarette 26' which has caused the generation of such signal is about to enter the testing station 53 is well known and forms no part of the present invention. For example, the signal delaying means can comprise a shift register which transports the defect signal at the rate at which the flutes 25 of the conveyor 24 advance toward the transfer station 53.

As mentioned above, opening of the regulating valve 44 results in admission of a stream of compressed air into the conduit 43; such air enters the chamber 42 and is discharged into the atmosphere to thereby induce a flow of air from the groove 38, into the conduit 39, thence into the chamber 42 and finally into the atmosphere. Therefore, the flute 25 which contains the defective cigarette 26' continues to attract such cigarette while the corresponding suction port or suction ports 31 communicate with the groove 38 so that the cigarette 26' advances past and beyond the transfer station 53 and continues to adhere to the conveyor 24 because the corresponding port or ports 31 then begin to communicate with a third groove 27' machined into the valve member 30 and connected to the suction generating device 28 (or to a discrete suction generating device) by a conduit 29a. The evacuation of air from the groove 38 takes place within an interval of a few milliseconds so that there is ample time to allow the satisfactory cigarette 26 which precedes the defective cigarette 26' to enter the oncoming flute 36 of the second conveyor 32 and to thereupon reduce the pressure in the groove 38 in order to cause the cigarette 26' to remain on the conveyor 24.

As the regulating valve 44 opens, it connects the source 46 of compressed air not only with the conduit 43 and chamber 42 but also with the pressure line 51 whose discharge end 52 directs a stream of compressed air into one or more ports 34 at the transfer station 53 at the exact moment when the defective cigarette 26' is in register with the oncoming empty flute 36. The admission of compressed air into the line 51 further reduces the likelihood of transfer of the defective cigarette 26' from the conveyor 24 onto the conveyor 32, even though the upstream end of the groove 33 in the peripheral surface of the valve member 30' extends to the transfer station 53. As mentioned above, the discharge end 52 of the line 51 is sufficiently close to the internal surface of the rotor 32a of the conveyor 32 to ensure that the flow of compressed air from the line 51 into the groove 33 is throttled or fully prevented so as to prevent ejection of transferred satisfactory cigarettes 26 from those flutes 36 whose ports 34 communicate with the groove 33.

If the cigarette 26' is followed by one or more satisfactory cigarettes 26, the signal which is transmitted via conductor means 47a disappears and the condition of the solenoid 47 is changed so that the regulating valve 44 closes before the foremost satisfactory cigarette 26 (following the cigarette 26') reaches the transfer station 53. Closing of the regulating valve 44 entails an immediate increase of pressure in the groove 38 so that the foremost satisfactory cigarette 26 is transferred onto the conveyor 32 rather than continuing to remain in its flute 25, i.e., on the conveyor 24. It has been found that atmospheric pressure in the groove 38 can be reestablished as quickly as a reduction of the pressure, i.e., within a few milliseconds so that the improved apparatus allows for selective transfer or retention of discrete cigarettes as well as of shorter or longer series of cigarettes with a heretofore unprecedented degree of reliability.

The defective cigarette (note the cigarette 26" in FIG. 3) which has been advanced beyond the transfer station 53 and has continued to adhere to the conveyor 24 is released or stripped off the conveyor 24 downstream of the groove 27' to descend into a container for defective articles or into a container for samples which are thereupon examined, e.g., for the purpose of ascertaining the quality of the testing action.

An advantage of connecting the grooves 27' and 33 with the first suction generating device 28 is that only two suction generating devices suffice for proper operation of the two conveyors 24 and 32.

The injectors 18 and 41 constitute the presently preferred second suction generating devices for use in the improved apparatus because they are capable of evacuating air from the respective grooves 17 and 38 within the aforementioned extremely short intervals of time. However, other types of suction generating devices can also be used, depending on the length of intervals which are available to establish or terminate subatmospheric pressure in the groove 17 or 38.

The length of the groove 38 in the valve member 30 of FIG. 3 is just sufficient to ensure retention of a single cigarette 26 or 26' in that portion of the endless path defined by the conveyor 24 which is adjacent to the transfer station 53. In other words, only one port 31 or a single row of such ports can communicate with the groove 38 at a time. This is especially desirable when the articles to be transported and classified are cigarettes which move sideways and form a row wherein individual cigarettes or short series of cigarettes must be segregated from the remaining cigarettes while the row is transported at a high or very high speed.

FIG. 1 shows that the adjustable or regulatable second suction generating device 18 can be placed rather close to the respective conveyor 2. In the apparatus of FIG. 3, the regulatable second suction generating device 41 is remote from the conveyor 24. The arrangement of FIG. 1 exhibits the advantage that the pipe 22 is relatively short to thereby even further reduce the interval of time which is needed to reduce or increase the pressure in the corresponding groove (17) of the associated valve member. This is especially important in modern high-speed tobacco processing machines wherein the discrete articles of a layer, file or row must be transported at a very high speed so that the intervals which are available for selective retention of articles on the corresponding conveyor (2) are extremely short. The art of solenoid-operated valves or other types of quick-valves is sufficiently developed to offer a wide variety of regulating or shutoff valves which can be used at 23 or 44 to ensure the opening or closing of such valves at the exact moment when the need for opening or closing arises, i.e., in immediate response to signals which are transmitted to the solenoids of the valves when the admission of compressed air to the conduit 21 or 43 is to be started or terminated. If necessary or desirable, the source (21a or 46) of compressed air can be installed directly in the interior of the respective conveyor (2 or 24) to further reduce the length of intervals which are required to change the pressure in the groove 17 or 38.

It goes without saying that the improved apparatus is susceptible of many further modifications without departing from the spirit of the invention. For example, the source 46 of compressed air can constitute a fan whose intake is connected with the conduits 29, 29a and 37, i.e., the source of compressed air can simultaneously constitute the means for evacuating air from the grooves 27, 27' and 33. Furthermore, the signal generator 49 can be combined with or replaced by a timer which transmits (when necessary) a certain number of signals in order to effect the segregation of a given number of samples from the row of articles 26 on the conveyor 24, i.e., which ensures that a preselected number of successive (satisfactory and/or defective) cigarettes will advance with the conveyor 24 past and beyond the transfer station 53.

A further important advantage of the improved apparatus is its simplicity. Therefore, such apparatus can be readily installed in existing production lines for the processing of tobacco, e.g., for the making of plain or filter cigarettes, cigarillos or cigars and/or for the making of plain or multiplex filter rod sections. Since the apparatus can selectively retain or permit the transfer of discrete articles which are closely adjacent to each other and advance at a high speed or at a very high speed, such apparatus can be used with particular advantage in modern high-speed cigarette making or cigarette processing machines. It has been found that the improved apparatus is much more reliable than heretofore known apparatus which are used for transport and classification of cigarettes or the like.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transporting a series of discrete articles, particularly a layer of articles of the tobacco processing industry, comprising a first conveyor having a first article supporting component movable along a first endless path and provided with first suction ports for retention of articles thereon; first suction generating means communicating with the ports in a first portion of said path; second suction generating means communicating with the ports in a second portion of said path; regulating means for activating and deactivating said second suction generating means so that the articles entering said second portion of said path are attracted to said component in activated condition of said second suction generating means; and a second conveyor including a second article supporting component movable along a second endless path having a portion adjacent to the second portion of said first path, said second component having second suction ports for retention of articles thereon.

2. The apparatus of claim 1, further comprising means for sealing the first ports in said first portion from the first ports in said second portion of said first path.

3. The apparatus of claim 1, wherein said first component is a rotary component and said path is a substantially circular path.

4. The apparatus of claim 1, further comprising means for connecting the ports of said second component with said first suction generating means, at least while such ports advance along said portion of said second path.

5. The apparatus of claim 1, further comprising means for selectively admitting a compressed gaseous fluid into the ports of said second component during travel of such ports along said portion of said second path.

6. The apparatus of claim 1, wherein the length of said second portion of said first path is sufficient to accommodate only one article at a time.

7. The apparatus of claim 6, wherein said first component has an annulus of equidistant first ports and the length of said second portion of said first path is such that it accommodates only one first port of said annulus at a time.

8. The apparatus of claim 1, wherein said second suction generating means connects the first ports in said second portion of said first path with the atmosphere in deactivated condition of said second suction generating means.

9. The apparatus of claim 1, wherein the articles are rod-shaped articles of the tobacco processing industry.

10. The apparatus of claim 1, wherein the articles are discrete sheets of paper or the like.

11. The apparatus of claim 1, wherein said first component is a rotary cylinder and further comprising means for sealing the first ports in said first portion from the first ports in said second portion of said first path, said sealing means comprising a stationary valve member adjacent to one axial end of said cylinder.

12. The apparatus of claim 1, wherein said first component is a hollow rotary cylinder and further comprising means for sealing the first ports in the first portion from the first ports in the second portion of said first path, said sealing means comprising a stationary valve member in the interior of said cylinder.

13. The apparatus of claim 1, wherein said first component is a rotary cylinder having a peripheral surface provided with axially parallel article-receiving means.

14. The apparatus of claim 1, wherein said second portion of said first path is located downstream of said first portion, as considered in the direction of movement of said first component.

15. The apparatus of claim 14, further comprising means for connecting the ports in a third portion of said first path with said first suction generating means, said third portion of said first path being located downstream of said second portion.

16. Apparatus for transporting a series of discrete articles, particularly a layer of articles of the tobacco processing industry, comprising a conveyor having an article supporting component movable along an endless path and provided with suction ports for retention of articles thereon; first suction generating means communicating with the ports in a first portion of said path; second suction generating means communicating with the ports in a second portion of said path, said second suction generating means comprising an injector including a source of compressed gaseous fluid, an open-ended suction pipe communicating with the ports in the second portion of said path, and conduit means for conveying compressed gaseous fluid past the open end of said pipe so that the latter draws air from the ports in said second portion of said path; and regulating means for activating and deactivating said second suction generating means so that the articles entering said second portion of said path are attracted to said component in activated condition of said second suction generating means, said regulating means comprising shutoff valve means in said conduit means.

17. Apparatus for transporting a series of discrete articles, particularly a layer of articles of the tobacco processing industry, comprising a first conveyor having a first article supporting component movable along a first endless path and provided with first suction ports for retention of articles thereon; first suction generating means communicating with said ports in a first portion of said path; second suction generating means communicating with the ports in a second portion of said path, said second suction generating means comprising a source of compressed gaseous fluid; regulating means for activating and deactivating said second suction generating means so that the articles entering said second portion of said path are attracted to said component in activated condition of said second suction generating means; a second conveyor having a second article supporting component movable along a second endless path having a portion adjacent to the second portion of said first path, said second component having second suction ports for retention of articles thereon; and means for admitting compressed gaseous fluid from said source into the ports of said second component while such ports advance along said portion of said second path and while said regulating means maintains said second suction generating means in activated condition.

18. Apparatus for transporting a series of discrete articles, particularly a layer of articles of the tobacco processing industry, comprising a conveyor having an article supporting component movable along an endless path and provided with suction ports for retention of articles thereon; first suction generating means communicating with the ports in a first portion of said path; second suction generating means communicating with the ports in a second portion of said path and including an injector having a source of compressed gaseous fluid; and regulating means for activating and deactivating said second suction generating means so that the articles entering said second portion of said path are attracted to said component in activated condition of said second suction generating means.

* * * * *